T. R. SINCLAIRE.
Improvement in Apparatus for Filtering Liquids.
No. 5,104.
Reissued Oct. 15, 1872.
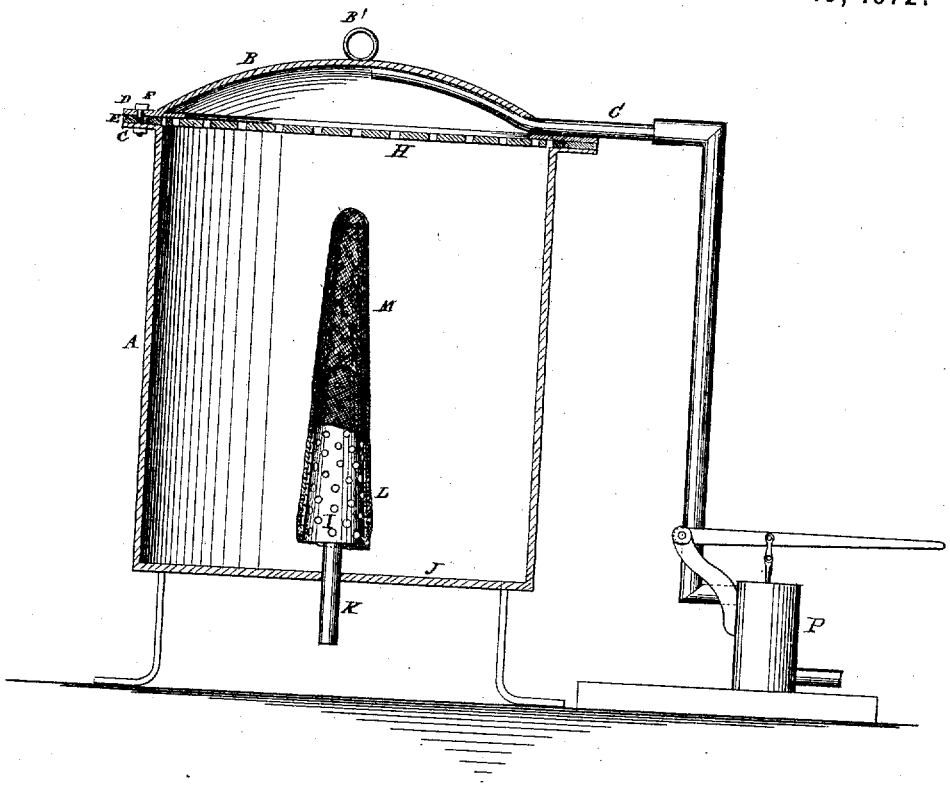
Witnesses:
A. W. Almqvist
Francis McArdle
Inventor:
T. R. Sinclaire.
PER
Munn & Co.
Attorneys.
THE NORRIS PETERS CO. PHOTO-LITHO., WASHINGTON, D. C.

UNITED STATES PATENT OFFICE.

THOMAS R. SINCLAIRE, OF NEW YORK, N. Y., ASSIGNOR TO SINCLAIRE RECTIFYING-MACHINE COMPANY.

IMPROVEMENT IN APPARATUS FOR FILTERING LIQUIDS UNDER PRESSURE.

Specification forming part of Letters Patent No. 120,908, dated November 14, 1871; reissue No. 5,104, dated October 15, 1872.

*To all whom it may concern:*

Be it known that I, THOMAS R. SINCLAIRE, of the city, county, and State of New York, have invented an Improvement in Apparatus for Filtering Liquids; and I do hereby declare that the following is a full, clear, and exact description of the same, reference being had to the accompanying drawing forming part of this specification, and which represents a vertical section of a filtering apparatus in illustration of my invention.

This invention relates to apparatus for filtering under pressure; and its main object is to overcome certain difficulties which have been met with in the use of the filtering apparatus for which Letters Patent of the United States were granted me, dated April 27, 1869, and July 6, 1869. In filtering under pressure on the old plan more or less of the liquid, it has been found, will force its way between the charcoal or other filtering material and the case or sides of the vessel containing the latter or through channels in the filtering material, and will consequently be but partially filtered or clarified, thus rendering the whole operation imperfect and unsatisfactory. To obviate this I combine with an air-tight or hermetically-closed filtering-vessel and means for introducing the liquid a perforated tube or receiver, of conical or other form, arranged within the filtering-vessel, and connected with, but preferably disposed at more or less distance from the bottom of said vessel, such receiver, which may consist of perforated metal wire-gauze and textile or fibrous material, or their equivalents, extending upward within the filtering-vessel and being surrounded by the charcoal or filtering material, the construction and arrangement being as hereinafter more fully shown and described.

A is the filtering-vessel, which may be of any suitable size and form, provided with a conical or oval top or cover, B, with a ring or eye, B′, for lifting and handling the same. C is a flange around the rim of the vessel. D is the cover-flange. E is packing between the two flanges. The cover is securely confined to the vessel by bolts F, so that the connection will allow liquids to be filtered under pressure, the vessel A being air-tight or hermetically closed. G is the pipe for charging the vessel with the liquid to be filtered under pressure by means of a pump or its mechanical equivalent, or by static or other pressure, said pipe here being shown, however, as connected with a force-pump, P, and being arranged to discharge the liquid beneath the conical cover, as represented, though I do not confine myself to this locality for the feed-pipe, nor to a single feed-pipe. H is a perforated plate, which is placed on top of the filtering material, and may be held in position by the inwardly-projecting cover-flange D. I represents the interior perforated receiving-tube attached to the bottom J of the vessel A by the delivery-tube K. In this example of my invention I show a perforated conical tube extending from the delivery-tube to near the top of the vessel, but I do not confine myself to this or any other particular form, nor to this particular locality for either the receiving or delivery tube, nor to a single receiving or delivery tube. The tube I is covered with wire-gauze, L, and outside of the wire-gauze is a covering of some textile or fibrous material, M. The filtering-vessel is filled or partially filled with charcoal or other filtering material for clarifying and purifying liquids. Charcoal is usually employed. By the introduction of the receiving-tube I all the liquid is compelled to pass and to be regularly distributed through the body of the filtering material, and into the perforated tube or receiver through the coverings thereof, by which operation all the liquid is thoroughly filtered and purified.

My main object is to thoroughly filter the liquid by forcing the same uniformly from all parts of the vessel toward the tube, and by the introduction of my perforated tube or receiver I the object is accomplished, inasmuch as whatever amount of liquid forces its way between the filtering material and the sides of the vessel is compelled to pass through the filtering material into the receiver I before it can escape by the delivery-tube K. Furthermore, by elevating said receiver I within the filtering material above the bottom J of the vessel A, any liquid forcing its way between said bottom and the filtering material will be similarly compelled to pass through the latter into the receiver I before it can escape from the vessel A, thus perfecting the desired result.

What is here claimed, and desired to be secured by Letters Patent, is—

1. The combination, with an air-tight or hermetically-closed filtering-vessel, of one or more perforated tubes or receivers, I, substantially as and for the purposes specified.

2. The combination, with an air-tight or hermetically-closed filtering-vessel and a pipe or tube for conveying liquid thereto, of one or more perforated tubes or receivers, I, substantially as and for the purposes specified.

3. In combination with a filtering-vessel and a force-pump or its equivalent, one or more perforated tubes or receivers, I, substantially as and for the purposes herein shown and described.

4. The perforated tube or receiver I arranged to occupy an elevated position at its base relatively to the bottom of a filtering-vessel, essentially as specified.

THOS. R. SINCLAIRE.

Witnesses:
FRED. HAYNES,
FERD. TUSCH.